United States Patent
Yong (10) Patent No.: US 10,003,684 B2
(45) Date of Patent: Jun. 19, 2018

(54) METHOD AND SYSTEM FOR SYNCHRONOUS OPERATIONS OF TEXT MESSAGE DATA

(71) Applicant: JRD Communication Inc., Shenzhen (CN)

(72) Inventor: Mingjun Yong, Shenzhen (CN)

(73) Assignee: JRD Communication Inc., Shenzhen, Guangdong (CN)

( * ) Notice: Subject to any disclaimer, the term of this patent is extended or adjusted under 35 U.S.C. 154(b) by 0 days. days.

(21) Appl. No.: 14/899,767

(22) PCT Filed: Apr. 8, 2015

(86) PCT No.: PCT/CN2015/076072
§ 371 (c)(1),
(2) Date: Dec. 18, 2015

(87) PCT Pub. No.: WO2016/090775
PCT Pub. Date: Jun. 16, 2016

(65) Prior Publication Data
US 2016/0173680 A1    Jun. 16, 2016

(30) Foreign Application Priority Data

Dec. 9, 2014 (CN) .......................... 2014 1 0753454

(51) Int. Cl.
*H04M 1/725* (2006.01)
*H04W 4/00* (2018.01)
*H04W 4/14* (2009.01)

(52) U.S. Cl.
CPC ....... *H04M 1/72552* (2013.01); *H04W 4/008* (2013.01); *H04W 4/14* (2013.01); *H04W 4/80* (2018.02); *H04M 1/72527* (2013.01)

(58) Field of Classification Search
CPC .......... H04M 1/7253; H04M 1/72547; H04M 1/72552; H04M 1/72597; H04M 1/72527;
(Continued)

(56) References Cited

U.S. PATENT DOCUMENTS

| 2011/0059769 A1* | 3/2011 | Brunolli ................ G08C 17/02 455/556.1 |
| 2012/0042087 A1* | 2/2012 | Berg ....................... H04L 63/08 709/229 |
| 2014/0298353 A1* | 10/2014 | Hsu ........................... G06F 9/54 719/313 |

* cited by examiner

*Primary Examiner* — Nam Huynh
(74) *Attorney, Agent, or Firm* — Shimokaji & Associates, P.C.

(57) ABSTRACT

A method and a system for synchronous operations of text message data, which may include, on one hand, that a feature phone receives an operation request regarding text message data from a user on the user interface, and the feature phone sends the operation request via Bluetooth to a smartphone. The smartphone can receive the operation request sent by the feature phone. The smartphone can carry out a corresponding operation, and obtain a first operation result. The smartphone can send the first operation result to the feature phone, and the feature phone can receive the first operation result. The feature phone can carry out an operation corresponding to the first operation result and can obtain a second operation result. Optionally, when local text message data of the smartphone changes, the smartphone can send a text message data modification notice to the feature phone, and the feature phone can receive the text message data modification notice. The feature phone can modify the text message data according to the text message data modification notice, and display the modified result on the user interface. In such a manner, at least one embodiment can operate text message data of the smartphone with an equiva- (Continued)

lently large screen via the feature phone with an equivalently small screen.

7 Claims, 8 Drawing Sheets

(58) Field of Classification Search
CPC ...... G06F 1/163; G06F 3/0482; H04W 4/008; H04W 4/14; H04W 68/00; H04W 4/12; H04L 51/04; H04L 51/10; H04L 51/12; H04L 51/24; H04L 51/26; H04L 51/38; H04B 1/385
See application file for complete search history.

METHOD AND SYSTEM FOR SYNCHRONOUS OPERATIONS OF TEXT MESSAGE DATA

TECHNICAL FIELD

The present disclosure relates to the field of communications technologies, and in particular relates to a method and a system for synchronous operations of text message data.

BACKGROUND

Currently, there are many mobile terminals with large screens on the market, such as large screen smartphones, and tablets. Relative to mobile terminals with small screens, mobile terminals with large screens are more comfortable and more practical when used to watch movies and surf the Internet.

However, a large screen mobile terminal typically requires two hands to operate. In many cases during traveling, a user can have only one free hand, and, it is may not be convenient to use a large screen mobile terminal. For example, on the subway, a text message arrives at a large screen mobile terminal of a user, and the user can have only one free hand at a moment. In such a circumstance, it may be very inconvenient for the user to check the text message.

SUMMARY

At least one embodiment provides a method and a system for synchronous operations of text message data, which can operate text message data of a smartphone with an equivalently large screen via a feature phone with an equivalently small screen.

One technical solution according to at least one exemplary embodiment provides a method for synchronous operations of text message data, can include: a feature phone which can receive an operation request regarding text message data from a user on the user interface, the operation request comprising one of a text message list synchronization request, a text message content viewing request, a text message deletion request, and a text message status update request; the feature phone may send the operation request via a Bluetooth serial port to a smartphone; the smartphone can receive the operation request sent by the feature phone; the smartphone can carry out an operation corresponding to the operation request, and can obtain a first operation result, the first operation result comprising one of a text message list, a text message content, a text message deletion result, and a text message status update result; the smartphone may send the first operation result to the feature phone; the feature phone can receive the first operation result sent by the smartphone; the feature phone can carry out an operation corresponding to the first operation result and obtains a second operation result.

Optionally prior to the step of the feature phone sending the operation request via a Bluetooth serial port to a smartphone, the feature phone can convert the operation request to an operation request with commands and parameters. The step of the feature phone sending the operation request via a Bluetooth serial port to a smartphone comprises: the feature phone may send the operation request with commands and parameters via a Bluetooth serial port to a smartphone.

Optionally the operation request comprises one of a text message list synchronization request and a text message content viewing request; prior to the step of the smartphone carrying out an operation corresponding to the operation request and obtaining a first operation result, it comprises: the smartphone carrying out analysis on the operation request with commands and parameters, and obtaining a first analysis result, the first analysis result comprising one of a text message list synchronization request and a text message content viewing request; the step of the smartphone carrying out an operation corresponding to the operation request and obtaining a first operation result comprises: according to the first analysis result, the smartphone carrying out an operation corresponding to the operation request and obtaining a first operation result, the first operation result comprising one of a text message list and a text message content; prior to the step of the feature phone carrying out an operation corresponding to the first operation result and obtaining a second operation result, it comprises: the feature phone carrying out analysis on the first operation result and obtaining a second analysis result, the second analysis result comprising one of the text message list and the text message content sent by the smartphone; the step of the feature phone carrying out an operation corresponding to the first operation result and obtaining a second operation result comprises: according to the second analysis result, the feature phone displays one of the text message list and the text message content on the user interface.

The operation request can include one of a text message deletion request and a text message status update request; prior to the step of the smartphone carrying out an operation corresponding to the operation request and obtaining a first operation result, it comprises: the smartphone carrying out analysis on the operation request with commands and parameters, and obtaining a first analysis result, the first analysis result comprising one of a text message deletion request and a text message status update request; the step of the smartphone carrying out an operation corresponding to the operation request and obtaining a first operation result comprises: according to the first analysis result, the smartphone carrying out an operation corresponding to the operation request and obtaining a first operation result, the first operation result comprising one of a text message deletion result and a text message status update result; prior to the step of the feature phone carrying out an operation corresponding to the first operation result and obtaining a second operation result, it comprises: the feature phone carrying out analysis on the first operation result and obtaining a second analysis result, the second analysis result comprising one of the text message deletion result and the text message status update result sent by the smartphone; the step of the feature phone carrying out an operation corresponding to the first operation result and obtaining a second operation result comprises: according to the second analysis result, the feature phone carrying out one of a text message deletion operation and a text message status update operation; after the step of the feature phone carrying out a second operation corresponding to the first operation result and obtaining a second operation result, it comprises: the feature phone displaying the result of one of the text message deletion operation and the text message status update operation on the user interface.

Another technical solution according to at least one exemplary embodiment provides a system for synchronous operations of text message data, the system comprising: a feature phone and a smartphone; the feature phone comprises: a first receiving module configured to receive an operation request regarding text message data from a user on the user interface, the operation request comprising one of a text message list synchronization request, a text message content viewing request, a text message deletion request, and a text message status update request; a sending module configured to send the operation request via a Bluetooth serial port to a smartphone; the smartphone comprises: a receiving module configured to receive the operation request sent by the feature phone; an obtaining module configured to carry out an operation corresponding to the operation request and obtain a first operation result, the first operation result comprising one of a text message list, a text message content, a text message deletion result, and a text message status update result; a first sending module configured to send the first operation result to the feature phone; the feature phone further comprises: a second receiving module configured to receive the first operation result sent by the smartphone; and an obtaining module configured to carry out an operation corresponding to the first operation result and obtain a second operation result.

At least one further embodiment of the feature phone further comprises a converting module, the converting module being configured to convert the operation request to an operation request with commands and parameters; the sending module of the feature phone is configured to send the operation request with commands and parameters via a Bluetooth serial port to the smartphone.

The operation request can include one of a text message list synchronization request and a text message content viewing request; the smartphone further comprises an analysis module, the analysis module being configured to carry out analysis on the operation request with commands and parameters, and obtaining a first analysis result, the first analysis result comprising one of a text message list synchronization request and a text message content viewing request; the obtaining module of the smartphone is specifically configured to, according to the first analysis result, carry out an operation corresponding to the operation request and obtain a first operation result, the first operation result comprising one of a text message list and a text message content; the feature phone further comprises an analysis module, the analysis module being configured to carry out analysis on the first operation result and obtain a second analysis result, the second analysis result comprising one of the text message list and the text message content sent by the smartphone; the obtaining module of the feature phone is specifically configured to, according to the first analysis result, display one of the text message list and the text message content on the user interface.

The operation request can include one of a text message deletion request and a text message status update request; the smartphone further comprises an analysis module, the analysis module being configured to carry out analysis on the operation request with commands and parameters, and obtain a first analysis result, the first analysis result comprising one of a text message deletion request and a text message status update request; the obtaining module of the smartphone is specifically configured to, according to the first analysis result, carry out an operation corresponding to the operation request and obtain a first operation result, the first operation result comprising one of a text message deletion result and a text message status update result; the feature phone further comprises an analysis module, the analysis module being configured to carry out analysis on the first operation result and obtain a second analysis result, the second analysis result comprising one of the text message deletion result and the text message status update result sent by the smartphone; the obtaining module of the feature phone is specifically configured to, according to the second analysis result, carry out one of a text message deletion operation and a text message status update operation; the feature phone further comprises a first display module, the first display module being configured to display the result of one of the text message deletion operation and the text message status update operation on the user interface.

Another technical solution according to at least one exemplary embodiment provides a system for synchronous operations of text message data, the system comprising: a smartphone and a feature phone; the smartphone comprises: a sending module configured to, when local text message data changes, send a text message data modification notice to the feature phone, the text message data modification notice comprising updated text message data; the feature phone comprises: a receiving module configured to receive the text message data modification notice sent by the smartphone; a modification module configured to modify the text message data according to the text message data modification notice; a display module configured to display the modified result on the user interface.

Advantageous effects of the examples of the present invention are: unlike the related art, according to at least one exemplary embodiment, on one hand, a feature phone can receive an operation request regarding text message data from a user on the user interface, the operation request comprising one of a text message list synchronization request, a text message content viewing request, a text message deletion request, and a text message status update request; the feature phone may send the operation request via a Bluetooth serial port to a smartphone; the smartphone can receive the operation request sent by the feature phone; the smartphone can carry out an operation corresponding to the operation request, and obtains a first operation result; the smartphone may send the first operation result to the feature phone; the feature phone can receive the first operation result sent by the smartphone; the feature phone can carry out an operation corresponding to the first operation result and obtains a second operation result; on the other hand, when local text message data of the smartphone changes, the smartphone may send a text message data modification notice to the feature phone; the feature phone can receive the text message data modification notice; modifies the text message data according to the text message data modification notice, and displays the modified result on the user interface. Since the feature phone may send the operation request regarding text message data from a user to the smartphone, the smartphone operates accordingly and may send the operation result to the feature phone, the feature phone operates accordingly; when the text message data changes, the smartphone notifies the feature phone, and the feature phone modifies the text message data accordingly. In such a manner, the user can operate text message data of a smartphone with an equivalently large screen via a feature phone with an equivalently small screen.

DETAILED DESCRIPTION

Embodiments of the present invention will be described in detail below with reference to the accompanying drawings and embodiments.

Figure 1:
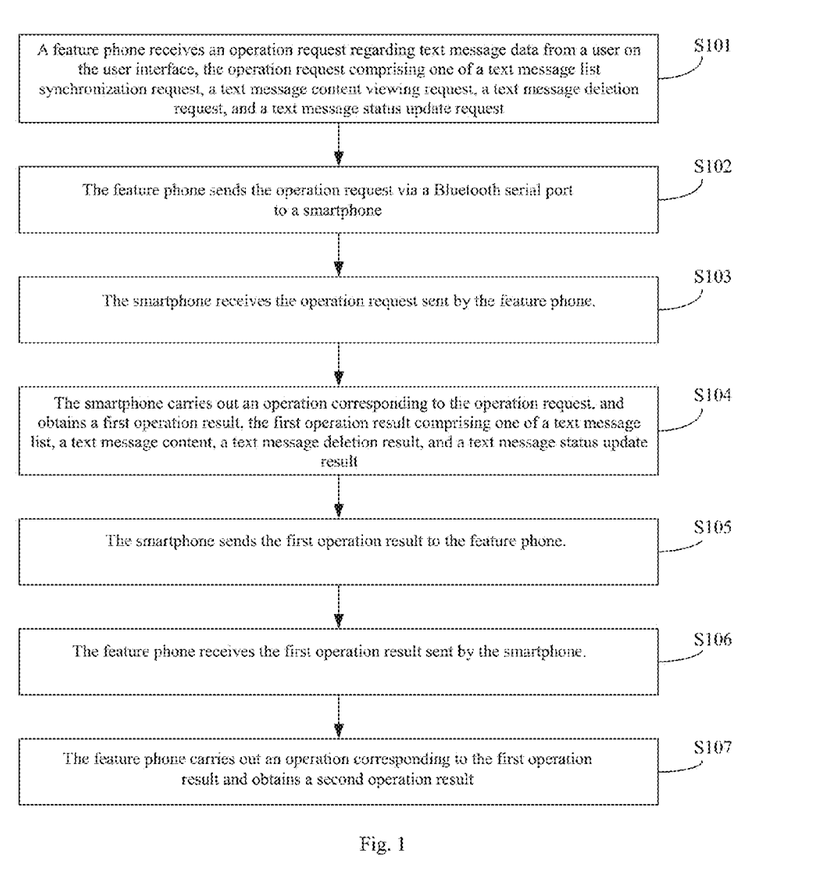
FIG. 1 depicts a flow chart of one embodiment of the method for synchronous operations of text message data according to at least one exemplary embodiment.

FIG. 1 depicts a flow chart of one embodiment of the method for synchronous operations of text message data according to at least one exemplary embodiment, and the present embodiment depicts a mode in which the feature phone end initiates an operation request, comprising:

Step S101: the feature phone can receive an operation request regarding text message data from a user on the user interface, the operation request comprising one of a text message list synchronization request, a text message content viewing request, a text message deletion request, and a text message status update request.

Feature Phone (FP) can be a type of equivalently low-end cell phone, its computation capabilities and functions are slightly inferior to those of smartphones, and generally does not have touch control functions; however, its functions are more than conventional cell phones that are only used for phone calls. A user may input an operation request to be executed on text message data via the user interface of a feature phone, and the operation request includes, but is not limited to, one of a text message list synchronization request, a text message content viewing request, a text message deletion request, and a text message status update request.

Step S102: the feature phone may send the operation request via a Bluetooth serial port to a smartphone.

Bluetooth serial port, i.e. the Bluetooth SPP protocol, is capable of establishing serial data transmission between Bluetooth devices. For example, Bluetooth serial port data transmission can be established between a Bluetooth module (BF10-A) and a Bluetooth module (BF10-A), between a Bluetooth module and a Bluetooth adaptor, and between a Bluetooth module and a PDA Bluetooth by resetting a SPP Bluetooth serial port.

Smartphone (SP) depicts a collective name of cell phone types that, is related to a personal computer, have an independent operating system and operating running space, can be installed, by a user on his own, with software, games, navigations and other programs provided by third party service providers, have touch control capabilities, and can realize wireless network access through a mobile communication network.

Bluetooth is a standard configuration for cell phones, and a feature phone may send an operation request via a Bluetooth serial port to a smartphone.

Step S103: the smartphone can receive the operation request sent by the feature phone.

Step S104: the smartphone can carry out an operation corresponding to the operation request, and obtains a first operation result, the first operation result comprising one of a text message list, a text message content, a text message deletion result, and a text message status update result.

The first operation result can be obtained by the smartphone carrying out an operation corresponding to the operation request. For example, when the operation request is a text message list request, the first operation result may be that the smartphone obtains a text message list; when the operation request is a text message content request, the first operation result may be that the smartphone obtains a text message content; when the operation request is a text message deletion request, the first operation result may be the result after the smartphone deletes the text message; when the operation request is a text message status update request, the first operation result may be the result after the smartphone performs a text message status update.

Step S105: the smartphone may send the first operation result to the feature phone.

Step S106: the feature phone can receive the first operation result sent by the smartphone.

Step S107: the feature phone can carry out an operation corresponding to the first operation result and obtains a second operation result.

As the first operation result comprises one of a text message list, a text message content, a text message deletion result, and a text message status update result, the feature phone can carry out an operation corresponding to the first operation result and obtain a second operation result, and the second operation result is the result obtained after the feature phone can carry out a corresponding operation according to the first operation result of the smartphone. In such a way, therefore, text message data of a smartphone with an equivalently large screen can be operated via a feature phone with an equivalently small screen.

In the present exemplary embodiment of the present invention, a feature phone can receive an operation request regarding text message data from a user on the user interface, the operation request comprising one of a text message list synchronization request, a text message content viewing request, a text message deletion request, and a text message status update request; the feature phone may send the operation request via a Bluetooth serial port to a smartphone; the smartphone can receive the operation request sent by the feature phone; the smartphone can carry out an operation corresponding to the operation request, and obtain a first operation result; the smartphone may send the first operation result to the feature phone; the feature phone can receive the first operation result sent by the smartphone; the feature phone can carry out an operation corresponding to the first operation result and obtain a second operation result. Since the feature phone may send the operation request regarding text message data from a user to the smartphone, the smartphone operates accordingly and sends the operation result to the feature phone, the feature phone operates accordingly, and in such a manner, the user can operate text message data of a smartphone with an equivalently large screen via a feature phone with an equivalently small screen.

Figure 2:
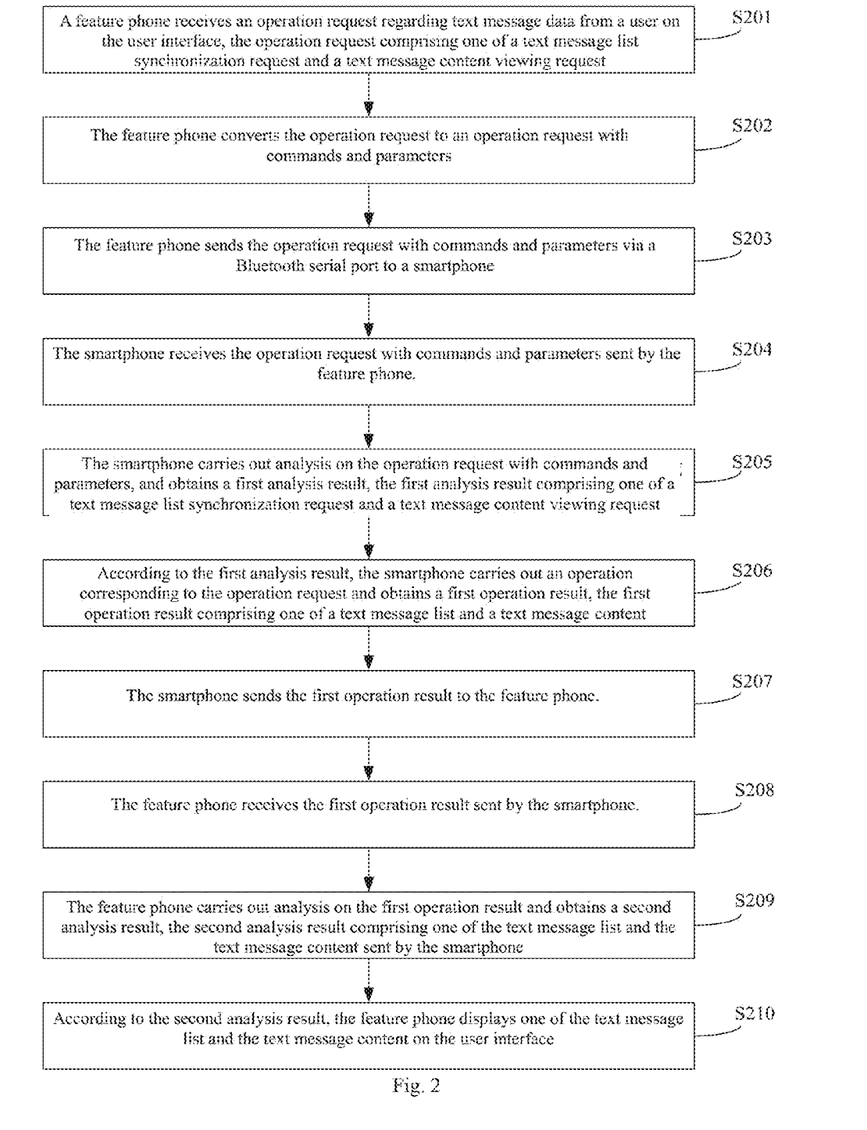
FIG. 2 depicts a flow chart of another embodiment of the method for synchronous operations of text message data according to at least one exemplary embodiment.

FIG. 2 depicts a flow chart of another embodiment of the method for synchronous operations of text message data according to at least one exemplary embodiment, and the present exemplary embodiment depicts a mode in which the feature phone end initiates an operation request, the present exemplary embodiment is substantially the same as the embodiment in FIG. 1, please see FIG. 1 and associated text description for the same aspects, specifically comprising:

Step S201: the feature phone can receive an operation request regarding text message data from a user on the user interface, the operation request comprising one of a text message list synchronization request and a text message content viewing request.

Step S202: the feature phone may convert the operation request to an operation request with commands and parameters.

The feature phone may convert the operation request to an operation request with commands and parameters, where the operation request can be mutually identified and analyzed in a simple and rapid way between the feature phone and the smartphone.

Step S203: the feature phone may send the operation request with commands and parameters via a Bluetooth serial port to a smartphone.

Step S204: the smartphone can receive the operation request with commands and parameters sent by the feature phone.

Step S205: the smartphone can carry out analysis on the operation request with commands and parameters, and obtain a first analysis result, the first analysis result comprising one of a text message list synchronization request and a text message content viewing request.

Step S206: according to the first analysis result, the smartphone can carry out an operation corresponding to the operation request and obtain a first operation result, the first operation result comprising one of a text message list and a text message content.

Step S207: the smartphone may send the first operation result to the feature phone.

Step S208: the feature phone can receive the first operation result sent by the smartphone.

Step S209: the feature phone can carry out analysis on the first operation result and obtain a second analysis result, the second analysis result comprising one of the text message list and the text message content sent by the smartphone.

Step S210: according to the second analysis result, the feature phone may display one of the text message list and the text message content on the user interface.

In the present exemplary embodiment of the present invention, a feature phone can receive an operation request regarding text message data from a user on the user interface, the operation request comprising one of a text message list synchronization request, a text message content viewing request, a text message deletion request, and a text message status update request; the feature phone may send the operation request via a Bluetooth serial port to a smartphone; the smartphone can receive the operation request sent by the feature phone; the smartphone can carry out an operation corresponding to the operation request, and obtain a first operation result; the smartphone may send the first operation result to the feature phone; the feature phone can receive the first operation result sent by the smartphone; the feature phone can carry out an operation corresponding to the first operation result and obtain a second operation result. Since the feature phone may send the operation request regarding text message data from a user to the smartphone, the smartphone operates accordingly and sends the operation result to the feature phone, the feature phone operates accordingly, and in such a manner, the user can operate text message data of a smartphone with an equivalently large screen via a feature phone with an equivalently small screen.

Figure 3:
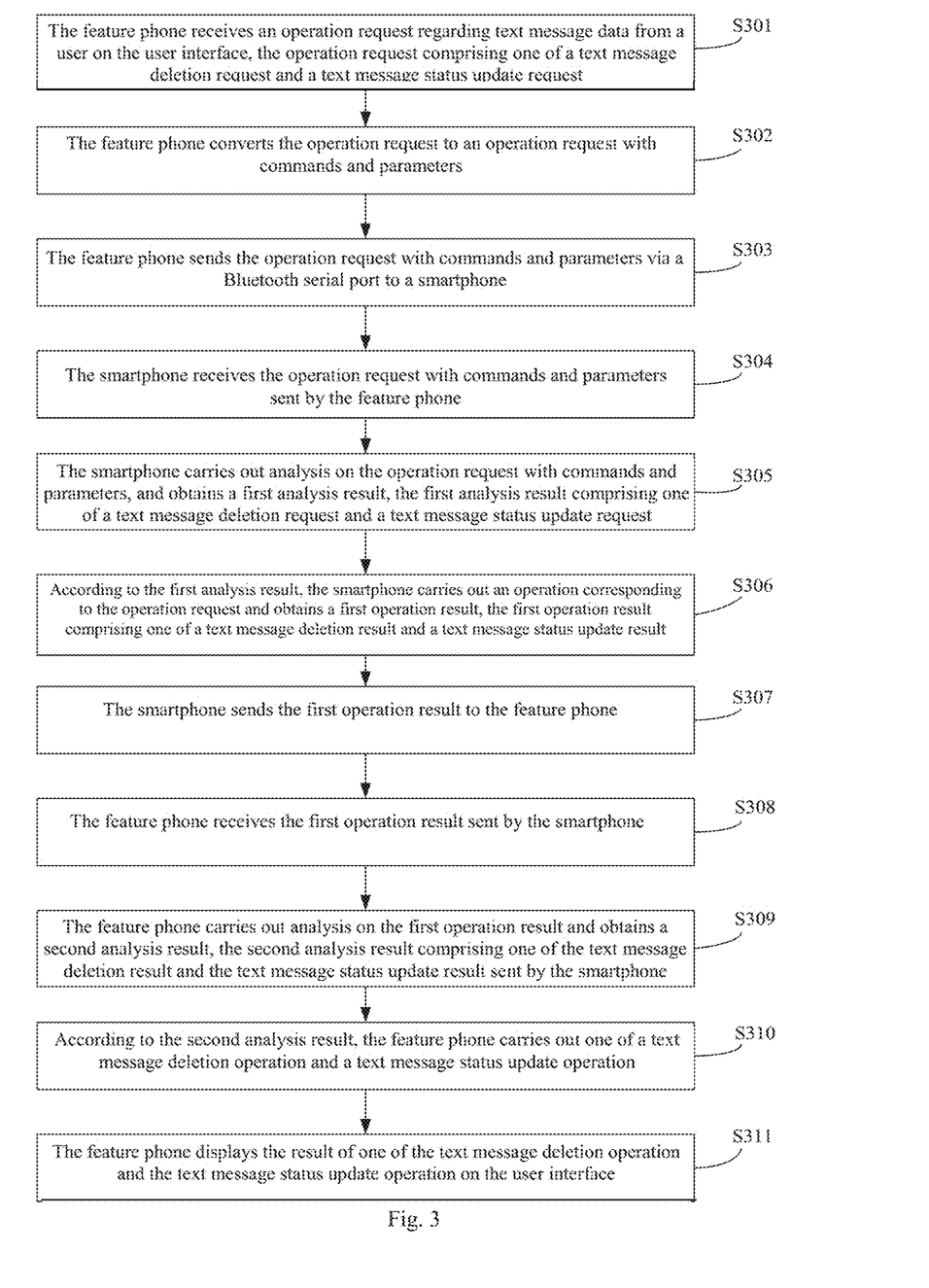
FIG. 3 depicts a flow chart of yet another embodiment of the method for synchronous operations of text message data according to at least one exemplary embodiment.

FIG. 3 depicts a flow chart of yet another embodiment of the method for synchronous operations of text message data according to at least one exemplary embodiment, and the present exemplary embodiment depicts a mode in which the feature phone end initiates an operation request, the present exemplary embodiment is substantially the same as the embodiment in FIG. 1, please see FIG. 1 and associated text description for the same aspects, specifically comprising:

Step S301: the feature phone can receive an operation request regarding text message data from a user on the user interface, the operation request comprising one of a text message deletion request and a text message status update request.

Step S302: the feature phone may convert the operation request to an operation request with commands and parameters.

The feature phone may convert the operation request to an operation request with commands and parameters, where the operation request can be mutually identified and analyzed in a simple and rapid way between the feature phone and the smartphone.

Step S303: the feature phone may send the operation request with commands and parameters via a Bluetooth serial port to a smartphone.

Step S304: the smartphone can receive the operation request with commands and parameters sent by the feature phone.

Step S305: the smartphone can carry out analysis on the operation request with commands and parameters, and obtain a first analysis result, the first analysis result comprising one of a text message deletion request and a text message status update request.

Step S306: according to the first analysis result, the smartphone can carry out an operation corresponding to the operation request and obtain a first operation result, the first operation result comprising one of a text message deletion result and a text message status update result.

Step S307: the smartphone may send the first operation result to the feature phone.

Step S308: the feature phone can receive the first operation result sent by the smartphone.

Step S309: the feature phone can carry out analysis on the first operation result and obtain a second analysis result, the second analysis result comprising one of the text message deletion result and the text message status update result sent by the smartphone.

Step S310: according to the second analysis result, the feature phone can carry out one of a text message deletion operation and a text message status update operation.

Step S311: the feature phone displays the result of one of the text message deletion operation and the text message status update operation on the user interface.

In at least one exemplary embodiment of the present invention, a feature phone can receive an operation request regarding text message data from a user on the user interface, the operation request comprising one of a text message list synchronization request, a text message content viewing request, a text message deletion request, and a text message status update request; the feature phone may send the operation request via a Bluetooth serial port to a smartphone; the smartphone can receive the operation request sent by the feature phone; the smartphone can carry out an operation corresponding to the operation request, and obtain a first operation result; the smartphone may send the first operation result to the feature phone; the feature phone can receive the first operation result sent by the smartphone; the feature phone can carry out an operation corresponding to the first operation result and obtain a second operation result. Since the feature phone may send the operation request regarding text message data from a user to the smartphone, the smartphone operates accordingly and sends the operation result to the feature phone, the feature phone operates accordingly, and in such a manner, the user can operate text message data of a smartphone with an equivalently large screen via a feature phone with an equivalently small screen.

Figures 4, 5:
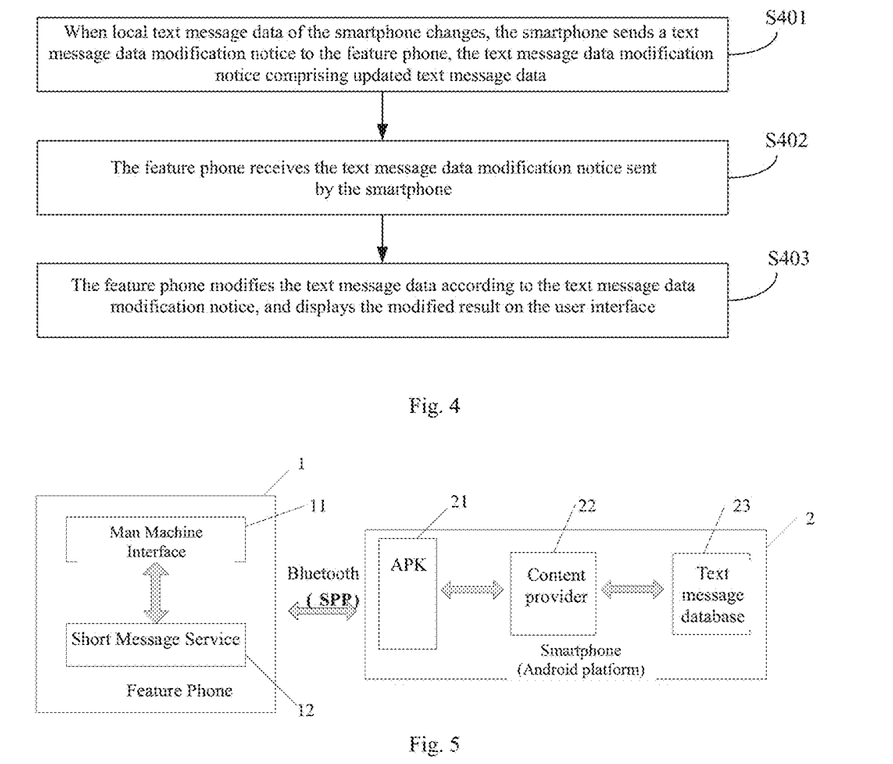
FIG. 4 depicts a flow chart of yet another embodiment of the method for synchronous operations of text message data according to at least one exemplary embodiment.
FIG. 5 illustrates the architecture of a feature phone and a smartphone when implementing the method for synchronous operations of text message data according to at least one exemplary embodiment.

Referring to FIG. 4, FIG. 4 depicts a flow chart of yet another embodiment of the method for synchronous operations of text message data according to at least one exemplary embodiment, and the present exemplary embodiment depicts a passive mode of the feature phone end, specifically comprising:

Step S401: when local text message data of the smartphone changes, the smartphone may send a text message data modification notice to the feature phone, the text message data modification notice comprising updated text message data.

Changes to local text message data of the smartphone include, for example, at the smartphone end, when a text message is deleted, the status of a text message is changed, a new text message is received, or a new draft is created.

Step S402: the feature phone can receive the text message data modification notice sent by the smartphone.

Step S403: the feature phone modifies the text message data according to the text message data modification notice, and displays the modified result on the user interface.

In the present exemplary embodiment of the present invention, when local text message data of a smartphone changes, the smartphone may send a text message data modification notice to the feature phone, the text message data modification notice comprising updated text message data; the feature phone can receive the text message data modification notice sent by the smartphone; the feature phone modifies the text message data according to the text message data modification notice, and displays the modified result on the user interface. Since the smartphone, when text message data changes, may send the changed text message data to the feature phone, the feature phone operates accordingly, and in such a manner, the user can also operate text message data of a smartphone with a equivalently large screen via a feature phone with a equivalently small screen.

The method for synchronous operations of text message data according to at least one exemplary embodiment will be described below with specific examples.

Referring to FIG. 5, FIG. 5 illustrates the architecture of a feature phone and a smartphone when implementing the method for synchronous operations of text message data according to at least one exemplary embodiment, and the Android platform is used as an example of the smartphone.

The whole system can include a feature phone FP end 1 and a smartphone SP end 2, and data transmission can be conducted between the FP end 1 and the SP end 2 via a Bluetooth BT SPP protocol. The FP end 1 may have a Man Machine Interface (MMI) layer 11 that primarily provides a user interaction interface for classification of text message data, for users to view text message lists and text message content, and contemporaneously, provides an operation menu with which a user may delete text messages, view detailed information; the FP end 1 may have a Short Message Service SMS service layer 12 that may be primarily responsible for functions such as data cache, data analysis, and data package, providing a set of ports to upper layers for accessing cache data and sending operation requests to the SP end 2, and with respect to lower layers, on one hand, receiving text data files transmitted by the SP end 2, analyzing the same, and saving the analyzed data locally, and on the other hand, packaging commands and parameters of the operation requests issued by the upper layers into files for transmitting to the SP end 2 via the BTSPP protocol; the APK (Android Package) 21 may be primarily responsible for data analysis, data construction and organization of the SP end 2, on one hand, can receive commands and parameters transmitted by the FP end 1, analyzes and executes corresponding actions, extracts and organizes corresponding data from a text message database 23 through a content provider 22, and then packages the same into a file for transmitting back to the FP end 1, and on the other hand, it may also monitor the local text message database 23, and if there is an update, it may immediately notify the FP end 2 of the update.

The action process of the FP end active mode may be as follows: upon collecting an operation request from a user, the MMI layer calls a corresponding port of the BTMAPC SRV layer, the MAP layer packages the commands and parameters (i.e. the operation request with commands and parameters), which is then sent to the SP end via the BT SPP protocol, upon receiving the operation request with commands and parameters, the SP end gets the commands and parameters through analysis, i.e. obtaining the first analysis result, then according to the first analysis result, BTMapservice calls SmsController to access the text message database, or obtain a text message list, or obtain a text message content, or delete a text message, or update a text message status. When the data has been organized (i.e. obtaining the first operation result, comprising a text message list, or obtain a text message content, or a text message deletion result, or a text message status update), it can be sent back to the FP end, when the FP end can receive the text message data file (i.e. the first operation result), the BTMAPC SRV layer can carry out analysis to get data (i.e. the second analysis result) and saves the same in the cache, and contemporaneously, notifies the MMI layer to update the interface display.

The FP end can comprise requests of four sub-communication processes, for example text message list synchronization request, text message content viewing request, text message deletion request, and text message status update request.

The data of the text message list synchronization can be placed in an Extensible Markup Language (XML) file with each message as a node; data of the text message content can be placed in a Visual Component Framework (VCF) file. The data synchronized to the FP end from the text message list and the text message content can be analyzed at the BTMAPC SRV layer and then saved to the local cache for the MMI layer to display.

The text message deletion and text message status update can be updated to the text message database at the SP end.

To save the loading time, the mode of dynamic loading can be employed during text message list synchronization, for example the FP end only loads data of a certain size from the SP end, and when the user scrolls the interface to the bottom of the list, the process is triggered again that the FP end loads the remaining data from the SP end.

The FP end and the SP end may uniquely identify a text message through one identical field, for example a mapping relationship can be established. For example, if the FP end intends to delete a text message with the handle of 00001, it may send the handle to the SP end, the SP end may convert the handle to a message ID, and then delete the message from the text message database.

The action process of the FP end passive mode depicts as follows: SmsController at the SP end first monitors a change to the text message database, then compares it with the status of the previously saved text message database, thereby determining if it depicts a new message, deleting a message, or a change to the text message status, subsequently packages the notice of the change (i.e. the text message data modification notice) and changed text message data (the text message data modification notice comprising updated text message data) and may send to the FP end, upon receiving the notice, the FP end, on one hand, updates the analyzed text message data to the local cache (i.e. modifies the text message data according to the text message data modification notice), and on the other hand, notifies the MMI layer to refresh the interface (i.e. displays the modified result on the user interface).

The monitor of the text message database by the SP end is through ContentObserver provided by Android, a corresponding ContentObserver is registered on the text message database, and when a change occurs to the text message database, the OnChange event in ContentObserver may be triggered, thereby monitoring the change to the text message database. Subsequently, the status of the current text message database and that of the previously cached text message database can be compared, and the specific change data can be searched.

In at least one embodiment, the text message database can be monitored through ContentObserver for example, any change to a record of the text message database can be immediately monitored, and it can be difficult that one text message data is added and then deleted without being observed by ContentObserver.

To decrease synchronization time, contemporaneously when sending the modification notice, the SP end pushes the modified text message data to the FP end, which prevents the FP end from sending a synchronization request again to acquire the data.

If the FP end is currently viewing a text message list, and the SP end has another update to the list, to save the synchronization time, the FP end will not completely load the list, instead, it simply can carry out addition or deletion on the data pushed by the SP end according to the modification notice type.

The message of modification notice and the modified text message data can be packaged into a VCF file and pushed together to the FP end, the BTMAPC SRV layer at the FP end can save the analyzed text message data in the local cache, and notify the MMI layer to update the interface display according to the notice type.

Figure 6:
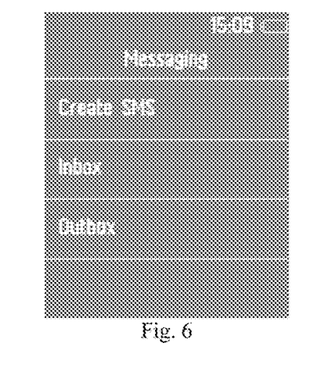
FIG. 6 illustrates the text message main interface in implementation of the method for synchronous operations of text message data according to at least one exemplary embodiment.
Figure 7:
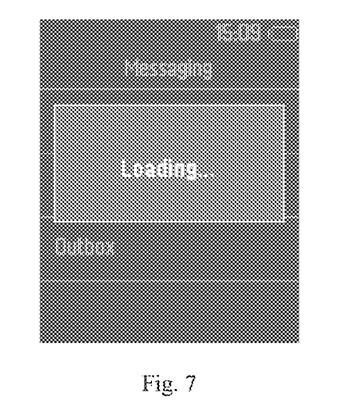
FIG. 7 illustrates loading a text message list in implementation of the method for synchronous operations of text message data according to at least one exemplary embodiment.
Figure 8:
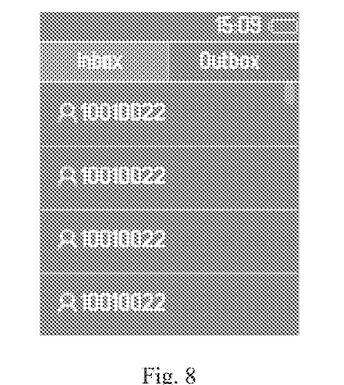
FIG. 8 illustrates the loaded text message list interface in implementation of the method for synchronous operations of text message data according to at least one exemplary embodiment.
Figure 9:
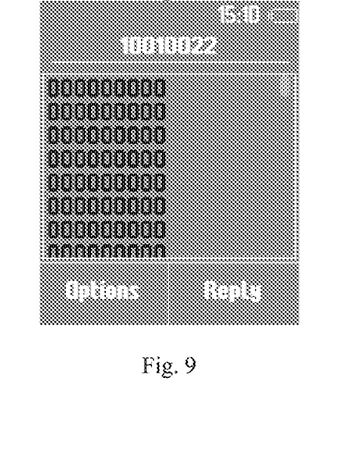
FIG. 9 illustrates the text message content viewing interface in implementation of the method for synchronous operations of text message data according to at least one exemplary embodiment.
Figure 10:
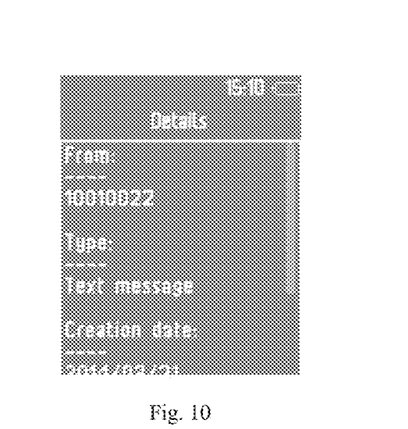
FIG. 10 illustrates the text message detailed information interface in implementation of the method for synchronous operations of text message data according to at least one exemplary embodiment.
Figure 11:
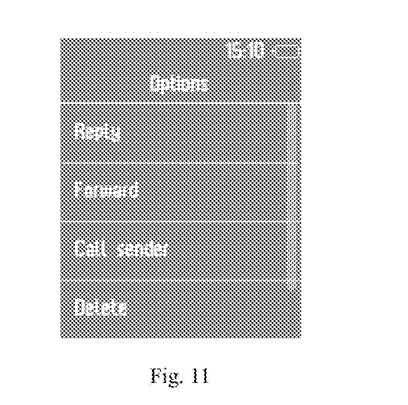
FIG. 11 illustrates the operation menu interface in implementation of the method for synchronous operations of text message data according to at least one exemplary embodiment.

Referring to FIGS. 6 to 11, FIGS. 6 to 11 illustrate the implementation of the method for synchronous operations of text message data according to at least one exemplary embodiment, wherein FIG. 6 illustrates the text message main interface, FIG. 7 illustrates loading a text message list, FIG. 8 illustrates the loaded text message list interface, FIG. 9 illustrates the text message content viewing interface, FIG. 10 illustrates the text message detailed information interface, and FIG. 11 illustrates the operation menu interface. It can be seen from these illustrations of specific implementation that, with the feature phone, a user can operate text message data of a smartphone with an equivalently large screen via a feature phone with an equivalently small screen.

Figure 12:
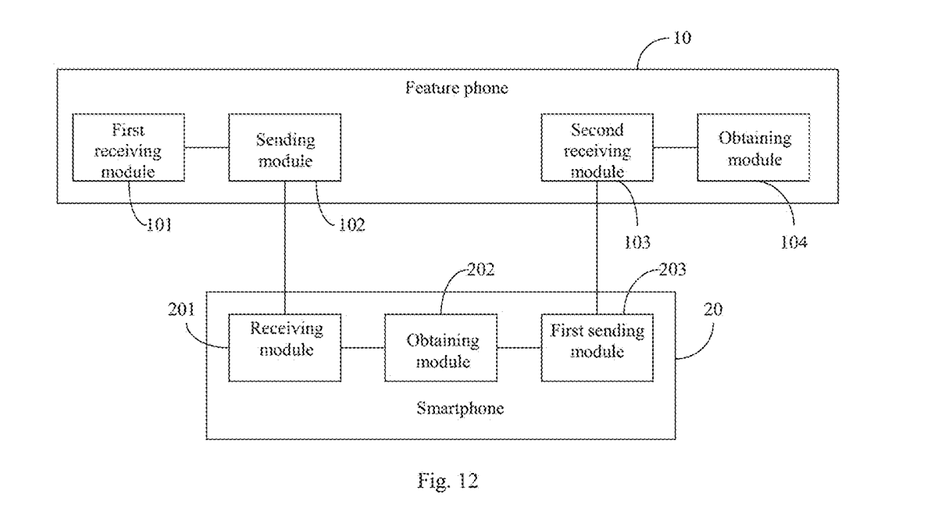
FIG. 12 illustrates the structure of one embodiment of the system for synchronous operations of text message data according to at least one exemplary embodiment.

Referring to FIG. 12, FIG. 12 illustrates the structure of one embodiment of the system for synchronous operations of text message data according to at least one exemplary embodiment, and the system comprises: a feature phone 10 and a smartphone 20.

Feature Phone (FP) depicts a type of equivalently low-end cell phone, its computation capabilities and functions can be slightly inferior to those of smartphones, but it has more functions than cell phones that are only used for phone calls.

Smartphone (SP) depicts a collective name of cell phone types that, related to a personal computer, have an independent operating system and operating running space, can be installed, by a user on his own, with software, games, navigations and other programs provided by third party service providers, and can realize wireless network access through a mobile communication network.

The feature phone 10 comprises: a first receiving module 101 and a sending module 102.

The first receiving module 101 is configured to receive an operation request regarding text message data from a user on the user interface, the operation request comprising one of a text message list synchronization request, a text message content viewing request, a text message deletion request, and a text message status update request.

The sending module 102 is configured to send the operation request via a Bluetooth serial port to the smartphone.

A user may input an operation request to be executed on text message data via the user interface of the feature phone, and the operation request includes, but is not limited to, one of a text message list synchronization request, a text message content viewing request, a text message deletion request, and a text message status update request.

Bluetooth serial port, i.e. the Bluetooth SPP protocol, is capable of establishing serial data transmission between Bluetooth devices. Bluetooth is a standard configuration for cell phones, and a feature phone may send an operation request via a Bluetooth serial port to a smartphone.

The smartphone 20 comprises: a receiving module 201, an obtaining module 202 and a first sending module 203.

The receiving module 201 can be configured to receive the operation request sent by the feature phone.

The obtaining module 202 can be configured to carry out an operation corresponding to the operation request and obtain a first operation result, the first operation result comprising one of a text message list, a text message content, a text message deletion result, and a text message status update result.

The first operation result can be obtained by the smartphone carrying out an operation corresponding to the operation request. For example, when the operation request is a text message list request, the first operation result is that the smartphone obtain a text message list; when the operation request is a text message content request, the first operation result is that the smartphone obtains a text message content; when the operation request is a text message deletion request, the first operation result is the result after the smartphone deletes the text message; when the operation request is a text message status update request, the first operation result may be the result after the smartphone performs a text message status update.

The first sending module 203 can be configured to send the first operation result to the feature phone.

The feature phone 10 further comprises: a second receiving module 103 and an obtaining module 104.

The second receiving module 103 can be configured to receive the first operation result sent by the smartphone.

The obtaining module 104 can be configured to carry out an operation corresponding to the first operation result and obtain a second operation result.

As the first operation result comprises one of a text message list, a text message content, a text message deletion result, and a text message status update result, the feature phone can carry out an operation corresponding to the first operation result and obtain a second operation result, and the second operation result is the result obtained after the feature phone can carry out a corresponding operation according to the first operation result of the smartphone. In such a way, therefore, text message data of a smartphone with an equivalently large screen can be operated via a feature phone with an equivalently small screen.

In the present exemplary embodiment of the present invention, a feature phone can receive an operation request regarding text message data from a user on the user interface, the operation request comprising one of a text message list synchronization request, a text message content viewing request, a text message deletion request, and a text message status update request; the feature phone may send the operation request via a Bluetooth serial port to a smartphone; the smartphone can receive the operation request sent by the feature phone; the smartphone can carry out an operation corresponding to the operation request, and obtain a first operation result; the smartphone may send the first operation result to the feature phone; the feature phone can receive the first operation result sent by the smartphone; the feature phone can carry out an operation corresponding to the first operation result and obtain a second operation result. Since the feature phone may send the operation request regarding text message data from a user to the smartphone, the smartphone operates accordingly and sends the operation result to the feature phone, the feature phone operates accordingly, and in such a manner, the user can operate text message data of a smartphone with a equivalently large screen via a feature phone with a equivalently small screen.

Figure 13:
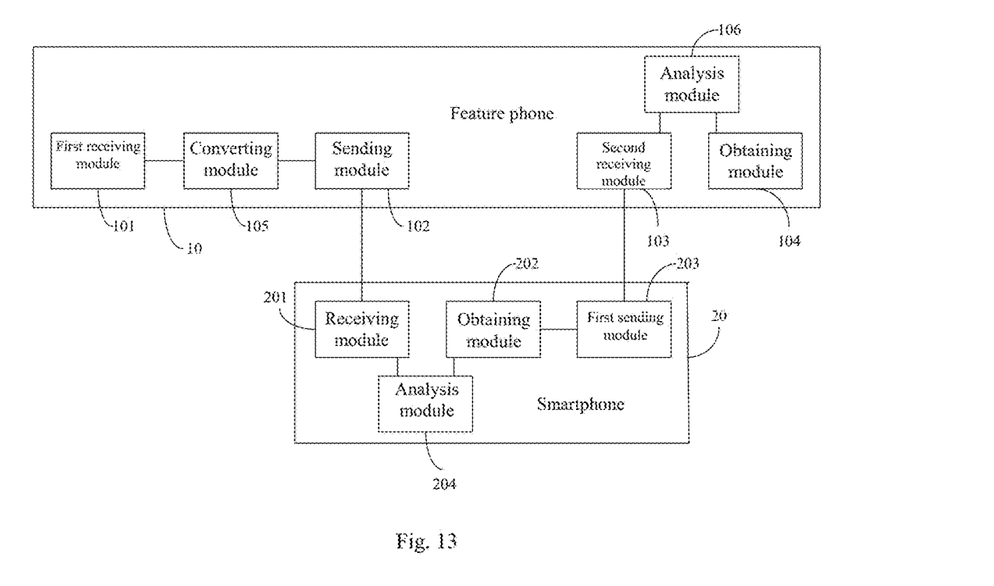
FIG. 13 illustrates the structure of another embodiment of the system for synchronous operations of text message data according to at least one exemplary embodiment.

Referring to FIG. 13, the feature phone 10 further comprises a converting module 105, the converting module 105 being configured to convert the operation request to an operation request with commands and parameters.

The operation request is converted to an operation request with commands and parameters, where the operation request can be mutually identified and analyzed in a simple and rapid way between the feature phone and the smartphone.

The sending module 102 of the feature phone 10 can be configured to send the operation request with commands and parameters via a Bluetooth serial port to the smartphone.

When the operation request comprises one of a text message list synchronization request and a text message content viewing request, the smartphone 20 further comprises an analysis module 204, the analysis module 204 being configured to carry out analysis on the operation request with commands and parameters, and obtain a first analysis result, the first analysis result comprising one of a text message list synchronization request and a text message content viewing request; at this moment, the obtaining module 202 of the smartphone 20 can be specifically configured to, according to the first analysis result, carry out an operation corresponding to the operation request and obtain a first operation result, the first operation result comprising one of a text message list and a text message content. The feature phone 10 further comprises an analysis module 106, the analysis module 106 being configured to carry out analysis on the first operation result and obtain a second analysis result, the second analysis result comprising one of the text message list and the text message content sent by the smartphone; at this moment, the obtaining module 104 of the feature phone 10 can be specifically configured to, according to the first analysis result, display one of the text message list and the text message content on the user interface.

Figure 14:
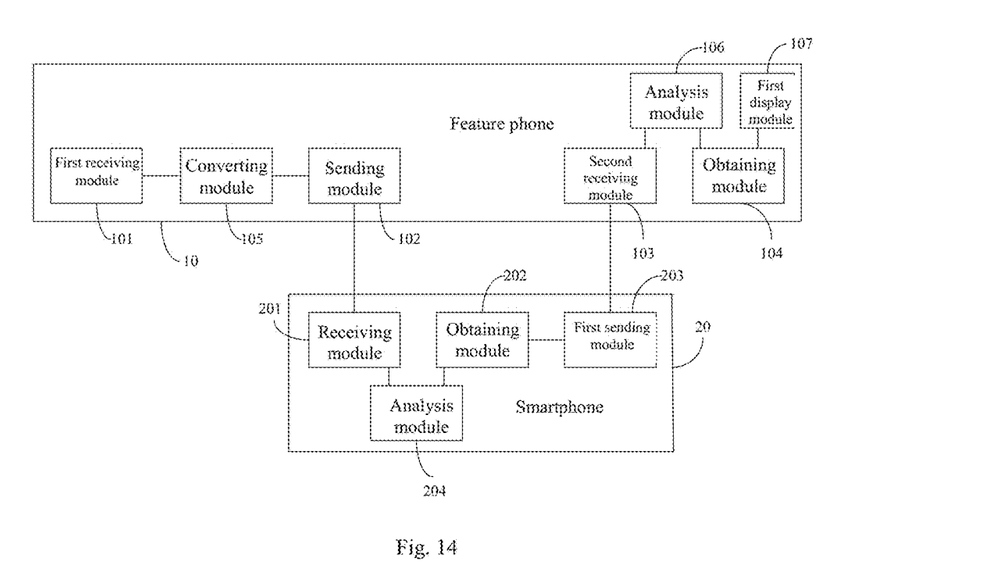
FIG. 14 illustrates the structure of yet another embodiment of the system for synchronous operations of text message data according to at least one exemplary embodiment.

Referring to FIG. 14, when the operation request comprises one of a text message deletion request and a text message status update request; the smartphone 20 further comprises an analysis module 204, the analysis module 204 being configured to carry out analysis on the operation request with commands and parameters, and obtain a first analysis result, the first analysis result comprising one of a text message deletion request and a text message status update request; at this moment, the obtaining module 202 of the smartphone 20 can be specifically configured to, according to the first analysis result, carry out an operation corresponding to the operation request and obtain a first operation result, the first operation result comprising one of a text message deletion result and a text message status update result; the feature phone 10 further comprises an analysis module 106, the analysis module 106 being configured to carry out analysis on the first operation result and obtain a second analysis result, the second analysis result comprising one of the text message deletion result and the text message status update result sent by the smartphone; at this moment, the obtaining module 104 of the feature phone 10 can be specifically configured to, according to the second analysis result, carry out one of a text message deletion operation and a text message status update operation; the feature phone 10 further comprises a first display module 107, the first display module 107 being configured to display the result of one of the text message deletion operation and the text message status update operation on the user interface.

Figure 15:
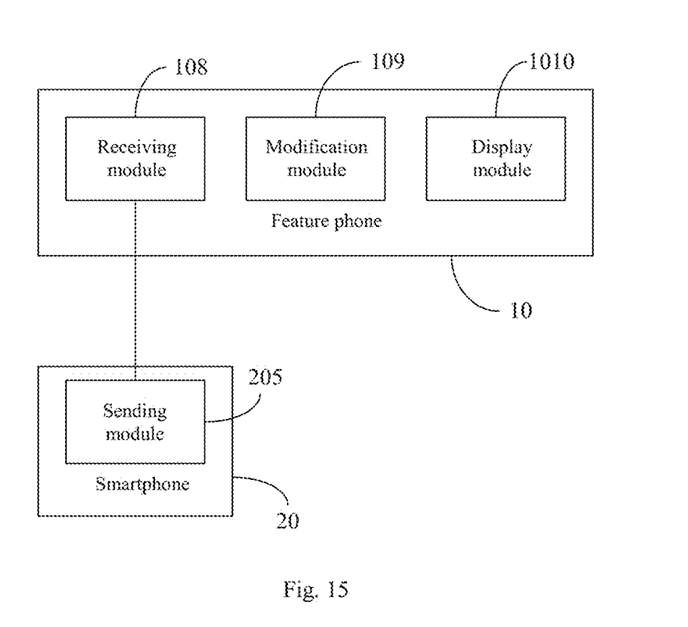
FIG. 15 illustrates the structure of yet another embodiment of the system for synchronous operations of text message data according to at least one exemplary embodiment.

Referring to FIG. 15, FIG. 15 illustrates the structure of yet another embodiment of the system for synchronous operations of text message data according to at least one exemplary embodiment, and the system comprises a feature phone 10 and a smartphone 20.

In the system, the smartphone 20 comprises: a sending module 205.

The sending module 205 is configured to, when local text message data changes, send a text message data modification notice to the feature phone, the text message data modification notice comprising updated text message data.

The feature phone 10 comprises: a receiving module 108, a modification module 109 and a display module 1010.

The receiving module 108 can be configured to receive the text message data modification notice sent by the smartphone.

The modification module 109 is configured to modify the text message data according to the text message data modification notice.

The display module 1010 is configured to display the modified result on the user interface.

In the present exemplary embodiment of the present invention, when local text message data of a smartphone changes, the smartphone may send a text message data modification notice to the feature phone, the text message data modification notice comprising updated text message data; the feature phone can receive the text message data modification notice sent by the smartphone; the feature phone modifies the text message data according to the text message data modification notice, and displays the modified result on the user interface. Since the smartphone, when text message data changes, may send the changed text message data to the feature phone, the feature phone operates accordingly, and in such a manner, the user can also operate text message data of a smartphone with an equivalently large screen via a feature phone with an equivalently small screen.

Only embodiments of the present invention are described above, which do not intend to limit the scope of the present invention. Any equivalent structure or equivalent procedure variation made according to the Specification and Drawings of the present invention, or direct or indirect applications in other related technical fields, can similarly be encompassed by the present invention.

The invention claimed is:

1. A method for synchronous operations of text message data, the method comprising:
    receiving, via a feature phone, an operation request including at least one of a text message deletion request or a text message status update request;
    converting, via the feature phone, the operation request to an operation request with commands and parameters; and
    sending, via the feature phone, the operation request with commands and parameters to a smartphone to carry out an analysis of the operation request with commands and parameters to obtain a first analysis result, and to carry out, based on the first analysis result, an operation corresponding to the operation request with commands and parameters to obtain a first operation result, the first operation result being at least one of a text message deletion result or a text message status update result, and to send the first operation result to the feature phone;
    receiving, via the feature phone, the first operation result;
    analyzing, via the feature phone, the first operation result to obtain a second analysis result including the at least one of a text message deletion result or a text message status update result;
    carrying out, via the feature phone, the at least one of a text message deletion result or a text message status update result; and
    displaying, via the feature phone, a result of the at least one of a text message deletion result or a text message status update result.

2. The method according to claim 1, wherein sending the operation request with commands and parameters to the smartphone to obtain a first operation result further comprises:
    sending at least one of a text message list synchronization request or a text message content viewing request to the smartphone to:
    carry out an analysis on the operation request with commands and parameters to obtain a first analysis result including at least one of the text message list synchronization request or the text message content viewing request; and
    carry out an operation corresponding to the operation request with commands and parameters to obtain the first operation result according to the first analysis result, the first operation result including at least one of the text message list or the text message content.

3. A system for synchronous operations of text message data, the system comprising:
    a feature phone including:
        a first receiving module configured to receive, from a user, an operation request including at least one of a text message deletion request or a text message status update request;
        a converting module to send via a Bluetooth Serial Port Profile (SPP) protocol, the operation request with commands and parameters to an obtaining module of a smartphone to carry out an analysis of the operation request with commands and parameters to obtain a first analysis result, and to carry out, based on the first analysis result, an operation corresponding to the operation request with commands and parameters to obtain a first operation result, the first operation result being at least one of a text message deletion result or a text message status update result, and to send the first operation result to the feature phone; and
        a second receiving module of the feature phone to receive the first operation result from a first sending module of the smartphone;
        an analysis model to analyze the first operation result to obtain a second analysis result including the at least one of a text message deletion result or a text message status update result; and
        an obtaining module to:
            carry out the at least one of a text message deletion result or a text message status update result, and
            display a result of the at least one of a text message deletion result or a text message status update result.

4. The system according to claim 3, wherein the operation request with commands and parameters includes at least one of a text message list synchronization request or a text message content viewing request, wherein
    the sending module is further configured to:
    send the operation request with commands and parameter to an analysis module of the smartphone to carry out analysis on the operation request with commands and parameters, and to obtain a first analysis result including at least one of a text message list synchronization request or a text message content viewing request, and
    where the obtaining module of the smartphone is configured to carry out an operation corresponding to the operation request with commands and parameters and to obtain a first operation result according to the first analysis result, the first operation result including at least one of the text message list or the text message content.

5. The system according to claim 3, wherein the feature phone further comprises:

a first display module configured to display, via a user interface of the feature phone, the at least one of a text message deletion result or a text message status update result.

6. A system for synchronous operations of text message data, the system comprising:
a smartphone including:
a first receiving module configured to receive, from a feature phone, at least one of a text message deletion request with commands and parameters or a text message status update request with commands and parameters;
an obtaining module to carry out an analysis of the least one of a text message deletion request with commands and parameters or the text message status update request with commands and parameters to obtain a first analysis result, and to carry out, based on the first analysis result, an operation corresponding to the least one of a text message deletion request with commands and parameters or the text message status update request with commands and parameters to obtain a first operation result, the first operation result being at least one of a text message deletion result or a text message status update result; and
a first sending module to send the first operation result to the feature phone to cause the feature phone to:
carry out the at least one of a text message deletion result or a text message status update result, and
display a result of the at least one of a text message deletion result or a text message status update result.

7. The system according to claim 6, wherein the first sending module further is to:
send the first operation result to an analysis module of the feature phone to carry out an analysis on the first operation result and to obtain a second analysis result including at least one of the text message deletion result or the text message status update result sent by the smartphone.

* * * * *